Sept. 6, 1960
J. A. GIALANELLA
2,951,928
INFRARED HEATER
Filed May 13, 1959
2 Sheets-Sheet 1
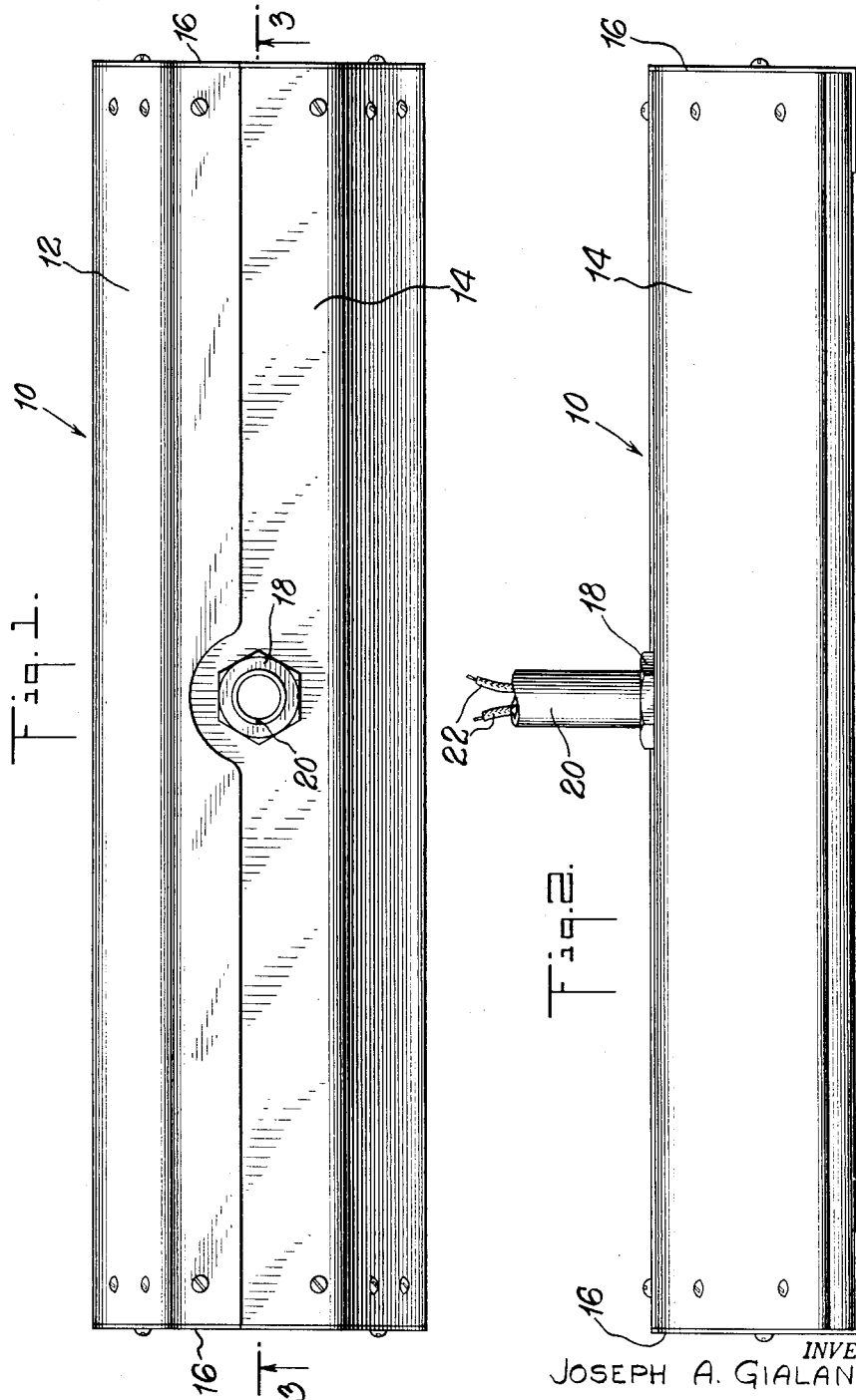
INVENTOR.
JOSEPH A. GIALANELLA
BY
Cyrus D. Samuelson
ATTORNEY Sept. 6, 1960     J. A. GIALANELLA     2,951,928
INFRARED HEATER
Filed May 13, 1959     2 Sheets-Sheet 2
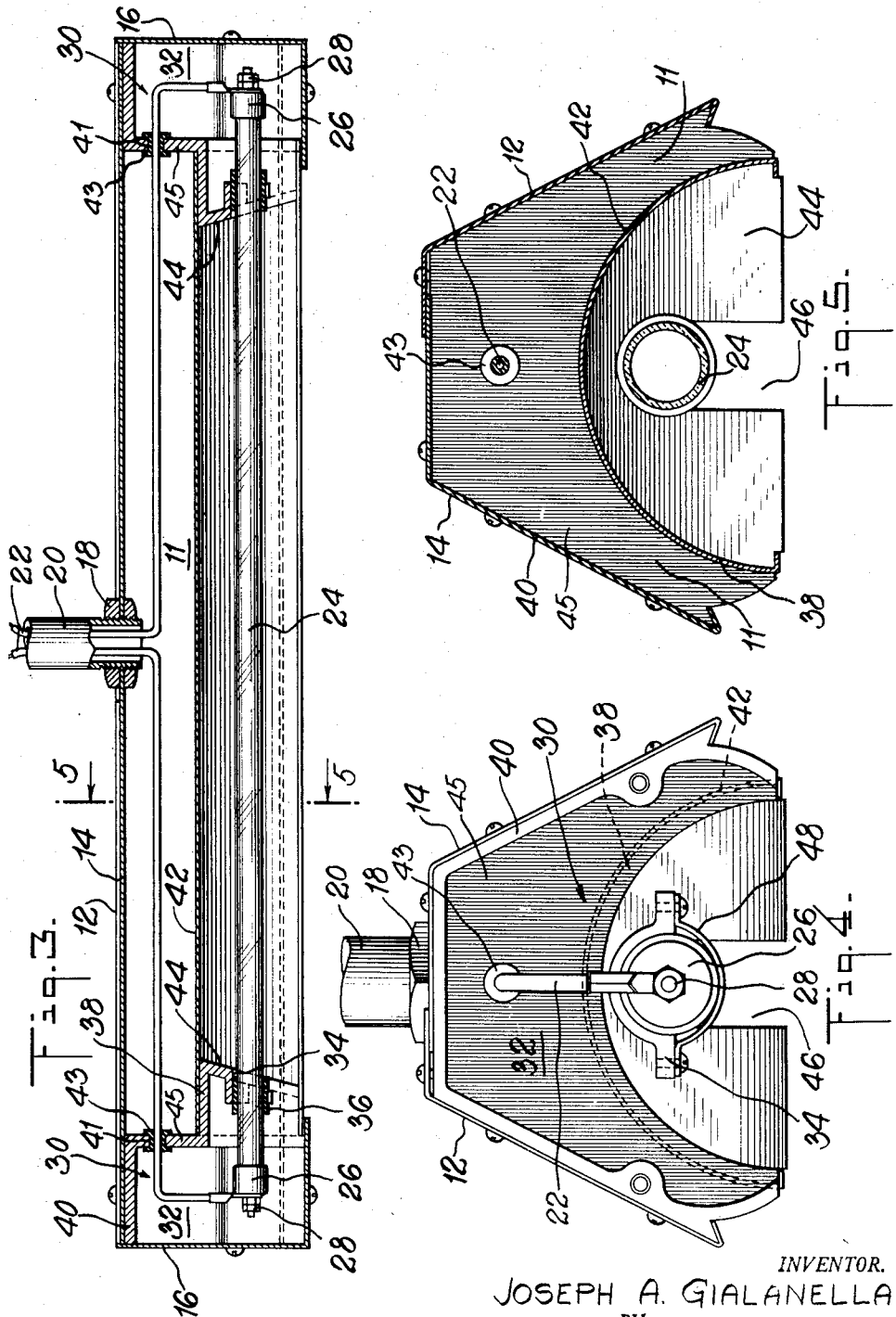
INVENTOR.
JOSEPH A. GIALANELLA
BY
*Cyrus D. Samuelson*
ATTORNEY

United States Patent Office 2,951,928
Patented Sept. 6, 1960

2,951,928

INFRARED HEATER

Joseph A. Gialanella, North Caldwell, N.J., assignor to Quartz Products Corporation, Plainfield, N.J., a corporation of Delaware Filed May 13, 1959, Ser. No. 812,852

6 Claims. (Cl. 219—34)

My invention relates to infrared heaters using tubular heating elements which may be used outdoors, which have provisions for air cooling the heater element and reflector and in which the reflector may be removed without removing the heater element.

It is an important object of my invention to provide an infrared heater wherein there is an airspace between the outer casing and the reflector whereby the device is cooled by the circulation of air through the airspace.

It is a further object of my invention to provide such a device wherein the reflector may be removed for cleaning or replacement without removing the heater element from the unit.

It is a still further object of my invention to provide such a device for use outdoors without a protective canopy and wherein the moisture collected between the casing and the reflector may drain off simply and easily.

These and other objects, advantages and features will be apparent during the course of the following description when taken in conjunction with the accompanying drawings wherein:

Figure 1 is a horizontal plan view of infrared heater of my invention,

Figure 2 is a slide elevational view of the heater of Figure 1,

Figure 3 is a cross-sectional view along the line 3—3 of Figure 1,

Figure 4 is an end elevational view with the end cover removed, and

Figure 5 is a cross-sectional view along the line 5—5 of Figure 3.

In the drawings, wherein, for the purpose of illustration, is shown a preferred embodiment of my invention, the numeral 10 generally designates an infrared heater of my invention which on Figure 1 is seen to comprise outer casing elements 12 and 14 and end plates 16. Mounting stem 20 is used to suspend the heater 10 from a ceiling or wall and is affixed to the casing by means of nut 18. The stem 20 is an auxiliary part, that is not always present, as the heaters can be suspended from eyebolts or drilled holes using chains, usually at each end of the heater. The wiring can either enter the heater through a knock-out hole in the top of the casing or through similar openings in either of the end elements. Furthermore, two such stems, at equal convenient distances from the center, may be used with the leads passing through either one of the stems.

In Figure 3, there are seen hollow, end elements 30 to which casings 12 and 14 and end plates 16 are affixed. End elements 30 comprise hollow section 32, outer shaped surfaces 40 and 38 and flat reflecting surface 44. Outer shaped surface 40 is shown as a trapezoid in cross-section but any other shape may be used. Outer shaped surface 38 is smaller in radius than surface 40 and is shown to be semicircular in cross-section but any other convenient shape, such as a parabolic cross-section, may be used. Flat surface 44 is tapered inwardly at the top and is preferably made of reflective material but it may be perpendicular to surface 38 and need not be of reflective material. Surface 44 makes an angle less than 180° with surface 38 and need not necessarily be an integral part of the end element. As shown in Figures 3, 4 and 5 there is a wall 45 between surfaces 38 and 40. Opening 46 is provided in surface 44 to enable the user to install heater element 24 in the fixture. Heater 24 is held in place by means of resilient element 48 which is affixed to bearing surface 34 as shown in Figure 4. Opening 41 is provided in wall 45 to permit lead 22 to be connected to the end of heater element 24 and to be brought from the end of the heater to the outer connection through stem 20. Insulated bushing 43 is placed in opening 41 to protect lead 22 where it goes through wall 45.

Bearing surface 34 is a projection from the rear of surface 44. Heater 24 is wrapped with strips 36 of asbestos or similar material which serves to insulate heater element 24 from end element 30. Reflector 42 is formed of material such as thin sheet aluminum or similar material which is both reflective and resilient and is provided with flanges so that it fits around surface 38 as shown in Figures 4 and 5. It can be seen from the figures that there is an airspace 11 provided between casings 12 and 14 and reflector 42 along the length of the fixture. This airspace serves to insulate the casings from the heat which is generated by the heater element.

Heater element 24 is provided with end caps 26 of ceramic or similar material and electrical connection nuts 28 by means of which the electrical connections are made to the heater element. To remove the reflector, it is only necessary to unhook the flange on one longitudinal edge of the reflector and slide it around the surfaces 38 until it is clear of the fixture. This may be done without removing the heater element. Wiring may be repaired when the reflector is so removed without removing the heater element or the wiring may be reached by removing outer casing 12 while leaving casing 14 and the balance of the fixture in place.

It is also within the contemplation of my invention to affix the fixture flush to the ceiling or wall or to recess it in the ceiling or wall and to take the electrical connections out through either or both of the end plates.

End elements 30 may be formed by stamping, forging, casting or any other suitable method so long as the material has sufficient rigidity and will withstand temperatures of the order of 500° F. I have found that aluminum is a very good material for this purpose. In the embodiment shown and described, the flat surface 44 is formed of highly reflective material such as polished aluminum. However, other reflective surfaces may be used as, for example, a reflective coating applied over the base material. These flat surfaces serve to reflect the heat inwardly and down from the fixture so that there is less heat absorbed at the ends of the device, and the useful radiation that would otherwise be lost at the ends, is redirected into the zone to be heated.

To assemble heaters of my invention, the procedure is as follows: casing 14 is affixed to end elements 30, stud 20 is affixed to casing 14 and wires 22 are fed into the interior of the fixture through stud 20, heater 24 is put in place and fastened down by means of clips 48, connections are made by means of nuts 28, the unit is put in place on the connection box or other device (not shown), reflector 42 is placed around surfaces 38 and held in place by means of the flanges, casing 12 and end plates 16 are affixed to end elements 30 and the fixture is ready for operation. The foregoing is one preferred method for assembling heaters of my invention but because of the ease of assembly and the accessibility of the parts, other procedures may be used with equally good results.

Heaters of my invention may be installed in outdoor locations where moisture is apt to collect in the heater since the moisture from rain or melting snow or ice will collect in the airspace 11 and will freely drain out of the fixture. This is not possible with the prior art heaters which use asbestos or other moisture retaining materials as insulation between the casing and the reflector or which do not provide for free drainage. It can easily be seen that the outside work at loading platforms and similar locations will be made more efficient and pleasant since it will now be possible to heat these formerly unheated areas.

While I have disclosed my invention in relation to a specific example and in a specific embodiment, I do not wish to be limited thereto, for obvious modifications will occur to those skilled in the art without departing from the spirit and scope of my invention.

Having thus described my invention, I claim:

1. An infrared heater comprising a pair of hollow end elements, said end elements having a first outer shaped surface at one end thereof and a second outer shaped surface at the other end thereof, said second outer shaped surface being smaller in radius than said first outer shaped surface and adjacent thereto such that there is a wall therebetween, a flat surface adjacent said second outer shaped surface and making an angle therewith less than 180°, said flat surface carrying an opening therein, an outer casing, said outer casing being affixed to said first outer surfaces of said end elements such that said end elements are spaced each from each and said flat surfaces face toward each other and such that the combination is self supporting, a tubular heating element having means for making electrical connections thereto at the ends thereof, securing means affixed to said flat surfaces, said heating element being placed in the openings in said flat surfaces and held in place therein by said securing means, a reflector of resilient material, said reflector having flanges along its longitudinal edges, said flanges being hooked under the outer edges of said second outer shaped surface such that said reflector assumes the shape of said second outer shaped surface and such that said casing and said reflector are spaced each from each along the longitudinal dimension of said heater, means for making electrical connections to said heating element, and end covers affixed to said end elements and enclosing said hollow portions of said end elements.

2. An infrared heater as described in claim 1 wherein said flat surfaces are tilted inwardly at their tops.

3. An infrared heater as described in claim 2 wherein said flat surfaces are formed of heat reflective material.

4. An infrared heater as described in claim 1 wherein said first outer shaped surface is trapezoidal in cross-section and said second outer shaped surface is semicircular in cross-section.

5. An infrared heater as described in claim 1 wherein said first outer shaped surface is trapezoidal in cross-section and said second outer shaped surface is parabolic in cross-section.

6. An infrared heater as described in claim 1 wherein said outer casing is formed of a plurality of longitudinal elements.

No references cited.